Sept. 3, 1957 F. E. LUTHER ET AL 2,804,902
CARRYING CASE FOR A BOX CAMERA
Filed May 25, 1956 2 Sheets-Sheet 1
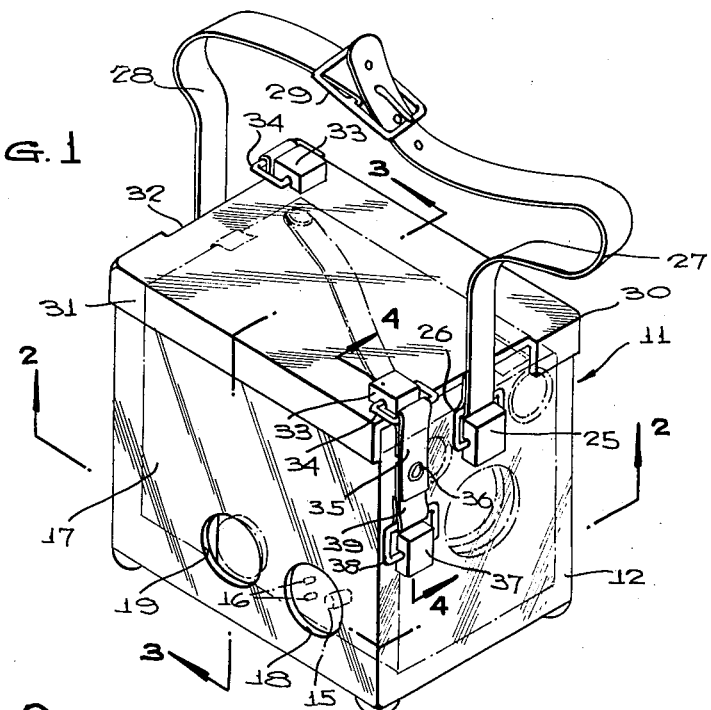
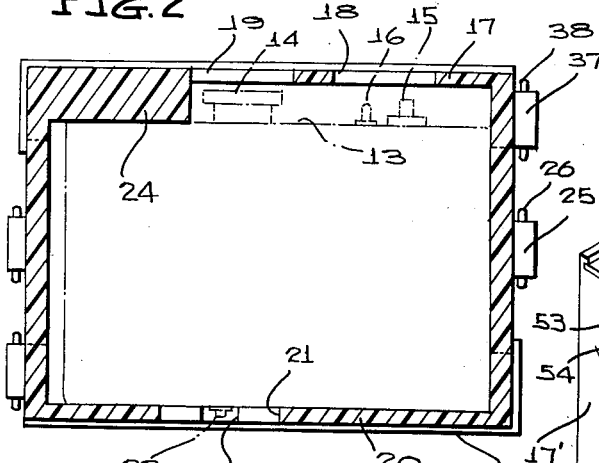
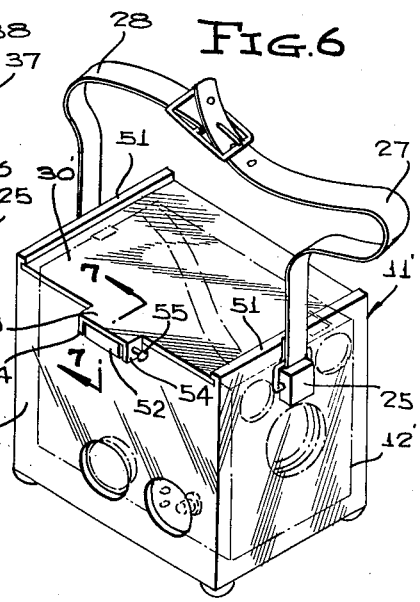
INVENTORS
FRANK E. LUTHER
& FLORENCE E. LUTHER
BY McMorrow, Berman & Davidson
ATTORNEYS Sept. 3, 1957  F. E. LUTHER ET AL  2,804,902
CARRYING CASE FOR A BOX CAMERA
Filed May 25, 1956  2 Sheets-Sheet 2
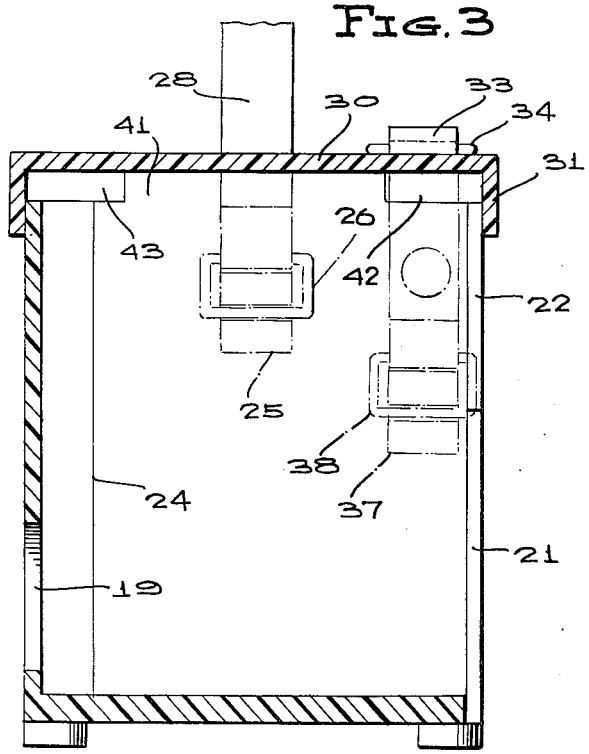
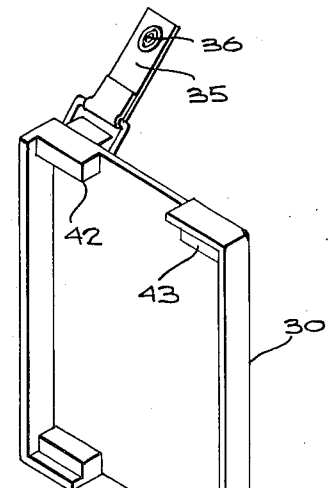
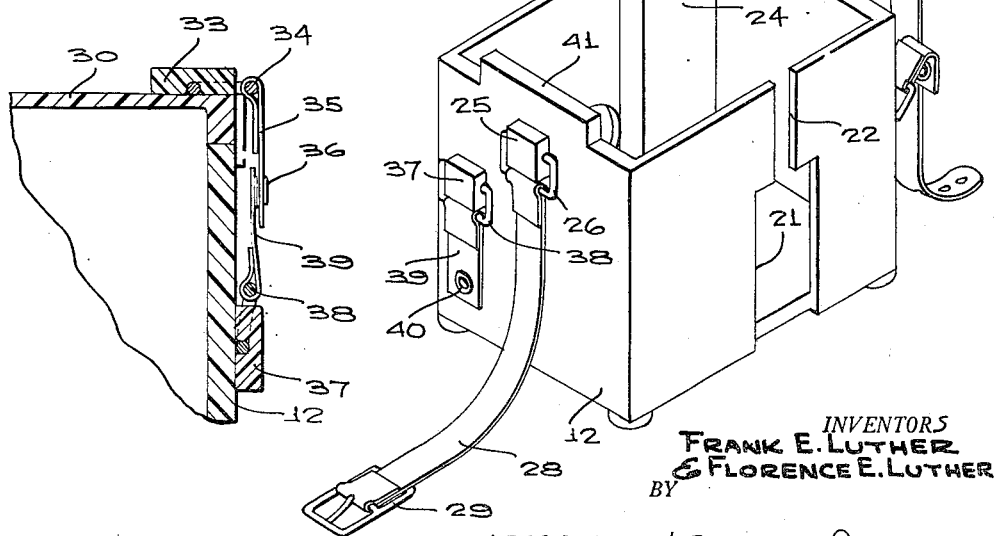
INVENTORS
FRANK E. LUTHER
& FLORENCE E. LUTHER
BY
McMorrow, Berman & Davidson
ATTORNEYS

United States Patent Office 2,804,902
Patented Sept. 3, 1957

2,804,902

CARRYING CASE FOR A BOX CAMERA

Frank E. Luther and Florence E. Luther, Seattle, Wash.

Application May 25, 1956, Serial No. 587,285

3 Claims. (Cl. 150—52)

This invention relates to photographic accessories, and more particularly to a carrying case for a box camera of the type having a shutter operating knob and a roll film winding knob at the side thereof.

A main object of the invention is to provide a novel and improved carrying case for a box camera, said carrying case being simple in construction, being attractive in appearance, and being arranged so that the shutter operating knob and roll film winding knob of a camera are readily accessible from outside the carrying case, whereby the camera may be at times employed without removal from the carrying case.

A further object of the invention is to provide an improved carrying case for a box camera of the type having a shutter operating knob and a roll film winding knob in a side thereof, the carrying case being relatively inexpensive to manufacture, being durable in construction, being arranged so that the camera contained therein is protected against accidental operation of the shutter operating member thereof, and the carrying case being arranged so that whenever desired, a flash attachment may be readily connected to the camera while the camera is contained in the carrying case, the arrangement being such that the camera may be employed with substantially normal efficiency without removing same from the carrying case.

Further objects and advantages of the invention will become apparent from the following description and claims, and from the accompanying drawings, wherein:

Figure 1 is a perspective view of an improved carrying case for a box camera constructed in accordance with the present invention.

Figure 2 is a horizontal cross sectional view taken on the line 2—2 of Figure 1.

Figure 3 is an enlarged transverse vertical cross sectional view taken on the line 3—3 of Figure 1.

Figure 4 is an enlarged cross sectional detail view taken on the line 4—4 of Figure 1.

Figure 5 is a perspective view showing the carrying case of Figure 1 in open position with the box camera removed therefrom.

Figure 6 is a perspective view of a modified form of box camera carrying case according to the present invention.

Figure 7 is an enlarged cross sectional detail view taken on the line 7—7 of Figure 6.

Referring to the drawings, and more particularly to Figures 1 to 5, 11 generally designates one form of improved box camera carrying case according to the present invention. The carrying case 11 comprises a rectangular receptacle 12 of transparent material, such as transparent plastic material, the receptacle being shaped to receive a conventional box camera, shown in dotted view at 13. The box camera is of a conventional type having roll film winding knob 14 and the shutter operating knob 15 at one side thereof, and being provided with terminals 16 for electrical connection to a flash attachment. The terminals 16 are located adjacent the shutter operating knob 15, and the side wall of the receptacle 12, shown at 17, is formed with a circular opening 18 substantially in registry with the knob 15 and terminals 16 to provide access thereto from outside the carrying case. The wall 17 is further provided with a second circular aperture 19 registering with the roll film winding knob 14 of the camera 13, whereby said knob may be manipulated from outside of the carrying case without necessitating the removal of the camera therefrom.

The opposite side wall of the carrying case, shown at 20, is formed at its intermediate portion with a vertical slot comprising the relatively wide lower portion 21 and the relatively narrow top portion 22, said vertical slot being disposed adjacent the fastening element 23 of the camera which is intended to be engaged with a conventional flash attachment clamping bracket, whereby the clamping bracket may be engaged with the camera while the camera is contained within the receptacle 12.

As shown in Figure 2, the side wall 17 has an internally thickened portion 24 located adjacent the aperture 19 and serving as a spacer to separate the side of camera 13 from the plane of the openings 19 and 18 by a sufficient distance to prevent accidental operation of the shutter control knob 15 under conditions of crowding or the like, wherein the case is likely to be brushed against or otherwise inadvertently touched.

Cemented or otherwise rigidly secured to the upper portions of the respective end walls of the case 12 substantially midway between the side walls 17 and 20 are respective block elements 25, 25 of suitable transparent material, such as transparent plastic material, or the like. Hingedly connected to the respective block elements 25 are the respective rectangular hinge loops 26 engaged by the respective flexible strap elements 27 and 28. The flexible strap element 28 is provided with a conventional buckle 29 in which the strap element 27 is receivable, as shown in Figure 1, whereby the elements 27 and 28 may be adjustably connected together to serve as a carrying strap for the case.

Designated at 30 is a generally rectangular cover of transparent material fitting the top of the receptacle 12. The cover 30 is provided with a depending marginal flange 31 which is engageable over the top rim of the receptacle 12, as shown in Figure 1. The flange 31 is cut away at the opposite ends of the cover 30, as shown at 32, 32, the cut away portions being oppositely related, as illustrated, and providing clearance for the carrying strap elements 27 and 28 when said elements are in vertical positions. Secured to diagonally opposite corner portions of cover 30 are the respective transparent blocks 33, 33 of transparent plastic material, or the like, to which are hinged the respective rectangular hinge loops 34, 34. The block elements 33 are located so that the hinge loops 34, when in horizontal positions, extend over the edges of the notches 32, as shown in Figure 1. Engaged on each rigid rectangular hinge loop 34 is a flexible strap element 35 provided with a snap fastener element 36. Respective block members 37 are secured to the end walls of the receptacle 12 in vertical registry with the strap element 35, said block elements 37 having hinged thereto the respective rectangular rigid loops 38 to which are secured the short strap elements 39. The strap elements 39 are provided with snap fastener members 40 lockingly engageable with the respective snap fastener elements 36 of the cover strap 35.

As shown in Figure 5, the respective end walls of the receptacle 12 are formed with the upstanding lug elements 41, 41 at their top edges, each lug element 41 being receivable between a pair of block elements 42 and 43 rigidly secured to the associated end portion of cover 30 when the cover is in its position shown in Figure 1 engaged on the top rim of receptacle 12. Thus, cover 30 interlocks with the lug elements 41, 41 and is rigidly secured in place on top of the receptacle 12 when the snap fastener elements 36, 40 at the opposite ends of the case are interengaged.

As will be readily apparent from Figure 1, the depending strap elements 35 attached to the hinge loops 34 extend closely adjacent to the end walls of the receptacle 12, extending through the notches 32 in the ends of the cover whereby the strap elements 35, 39 lie closely adjacent to the end walls of receptacle 12 when the snap fastener elements 36, 40 are interengaged.

Since the carrying case is made of clear transparent material, the camera may be employed without removing same from the carrying case, since access to the shutter operating element 15 may be readily obtained through the aperture 18 and access to the roll film control knob 14 may be readily obtained through the aperture 19. Furthermore, when required, a conventional flash attachment may be used with the camera since the flash attachment bracket may be engaged with the fastener 23 through the vertical slot provided in the side wall 20 of the receptacle 12, as above explained.

Referring now to the form of the invention illustrated in Figures 6 and 7, the case, designated generally at 11' comprises a main receptacle 12' generally similar to the previously described receptacle 12 but which is formed to slidably receive a flat top cover 30' in respective guide grooves 50 formed in the inside surfaces of the top marginal portions of the end walls of the receptacle.

As shown in Figure 6, the end walls of receptacle 12' have top portions 51, 51 rising above the top edges of the side walls of the receptacle, said top portions 51, 51 being formed with the transversely extending guide grooves 50 which slidably receive the end edges of the flat top cover 30'. One of the side walls 17' of the case 12' is provided at the intermediate portion of its top edge with an outwardly projecting rectangular lug 52. The cover 30' is similarly provided with a rectangular lug 53 having depending end flanges 54, 54, defining a channel in which the lug 52 is receivable when the cover 30' is in its closed position. A locking pin 55 is engageable through the lugs 54 and 52, in the manner shown in Figures 6 and 7 to secure the cover 30' in its closed position. When the cover is to be removed, the pin 55 is removed, releasing the cover and allowing the cover to be withdrawn from the guide groove 50, allowing the box camera to be lifted out of the receptacle 12'.

While certain specific embodiments of an improved carrying case for a box camera have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A carrying case for a box camera of the type having a shutter operating knob and a roll film winding knob at one side thereof comprising a rectangular receptacle of transparent material shaped to receive the camera, and an internally thickened wall portion at the side of the receptacle receiving the side of the camera having the film winding knob and shutter operating knob, the side wall of the receptacle adjacent said thickened portion being formed with respective apertures spaced to register with the camera film winding knob and shutter operating knob, whereby said knobs may be operated while the camera is in said receptacle.

2. A carrying case for a box camera of the type having a shutter operating knob and a roll film winding knob at one side thereof comprising a rectangular receptacle of transparent material shaped to receive the camera, and an internally thickened wall portion at the side of the receptacle receiving the side of the camera having the film winding knob and shutter operating knob, the side wall of the receptacle adjacent said thickened portion being formed with respective apertures spaced to register with the camera film winding knob and shutter operating knob, whereby said knobs may be operated while the camera is in said receptacle, the opposite side wall of the receptacle being formed with a vertical slot spaced to receive a camera flash attachment clamp.

3. A carrying case for a box camera of the type having a shutter operating knob and a roll film winding knob at one side thereof comprising a rectangular receptacle of transparent material shaped to receive the camera, and an internally thickened wall portion at the side of the receptacle receiving the side of the camera having the film winding knob and shutter operating knob, the side wall of the receptacle adjacent said thickened portion being formed with respective apertures spaced to register with the camera film winding knob and shutter operating knob, whereby said knobs may be operated while the camera is in said receptacle, the opposite side wall of the receptacle being formed with a vertical slot spaced to receive a camera flash attachment clamp, said vertical slot comprising a relatively wide lower portion and a relatively narrow upper portion.

References Cited in the file of this patent

UNITED STATES PATENTS

| 2,136,357 | Darling et al. | Nov. 8, 1938 |
| 2,172,348 | Githens et al. | Sept. 12, 1939 |
| 2,478,267 | Hickler | Aug. 9, 1949 |
| 2,565,006 | Trickey | Aug. 21, 1951 |
| 2,732,876 | Hepting | Jan. 31, 1956 |

FOREIGN PATENTS

| 759,162 | Germany | Jan. 18, 1954 |